(12) United States Patent
Barnhart (10) Patent No.: US 8,554,607 B2
(45) Date of Patent: Oct. 8, 2013

(54) METHOD AND SYSTEM FOR SECURING NETWORK-BASED ELECTRONIC VOTING

(75) Inventor: Robert M. Barnhart, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 1845 days.

(21) Appl. No.: 09/805,279

(22) Filed: Mar. 13, 2001

(65) Prior Publication Data

US 2002/0133396 A1    Sep. 19, 2002

(51) Int. Cl.
*G06F 11/00* (2006.01)
*G06F 13/00* (2006.01)

(52) U.S. Cl.
USPC .......................................................... 705/12

(58) Field of Classification Search
USPC .......................................................... 705/12
See application file for complete search history.

(56) References Cited

U.S. PATENT DOCUMENTS

| | | | | |
|---|---|---|---|---|
| 5,189,288 A | * | 2/1993 | Anno et al. .................... | 235/386 |
| 5,412,727 A | * | 5/1995 | Drexler et al. ................. | 713/186 |
| 5,521,980 A | * | 5/1996 | Brands ............................ | 380/30 |
| 5,875,432 A | * | 2/1999 | Sehr ................................ | 705/12 |
| 6,021,200 A | * | 2/2000 | Fischer .......................... | 705/74 |
| 6,035,041 A | * | 3/2000 | Frankel et al. ................. | 380/30 |
| 6,081,793 A | * | 6/2000 | Challener et al. .............. | 705/50 |
| 6,085,321 A | * | 7/2000 | Gibbs et al. ................... | 713/170 |
| 6,144,739 A | * | 11/2000 | Witt et al. ......................... | 380/2 |
| 6,317,833 B1 | * | 11/2001 | Jakobsson ...................... | 713/181 |
| 6,523,115 B1 | * | 2/2003 | Ono et al. ...................... | 713/181 |
| 6,540,138 B2 | * | 4/2003 | Hall et al. ...................... | 235/386 |
| 6,550,675 B2 | * | 4/2003 | Davis et al. .................... | 235/386 |
| 6,779,727 B2 | * | 8/2004 | Warther .................... | 235/462.01 |
| 6,817,515 B2 | * | 11/2004 | Winnett ......................... | 235/386 |
| 6,836,765 B1 | * | 12/2004 | Sussman .......................... | 705/75 |
| 6,845,447 B1 | * | 1/2005 | Fujioka et al. ................ | 713/156 |

(Continued)

FOREIGN PATENT DOCUMENTS

| | | | |
|---|---|---|---|
| JP | 10074046 A | * | 1/1998 |
| WO | WO 00/13082 | * | 3/2000 |
| WO | WO 01/22200 A2 | * | 3/2001 |
| WO | WO 0122200 A2 | * | 3/2001 |

OTHER PUBLICATIONS

Karro, J., Wang, J., Towards a Practical, Secure, and Very Large Scale Online Election Computer Security Applications Conference, 1999. (ACSAC '99), Dec. 6-10, 1999 , pp. 161-169.*

(Continued)

*Primary Examiner* — Scott L Jarrett (74) *Attorney, Agent, or Firm* — Bey & Cotropia PLLC (57) ABSTRACT

A method and system for securely voting over a network, such as a global computer network, involves a system which delivers an electronic ballot from a server with the server's private key and a vote serial number on the ballot to an individual terminal connected to the network. The ballot may be filled in and a subset of the filled-in ballot is created with a digital signature created from the individual's secret key on the subset of the ballot corresponding to the ballot choices. The subset of the filled-in ballot together with the individual's electronic signature, and a vote serial number is then delivered to the server. A data element is then created to record a subset of the ballot in a data store at the server, in which the ballot vote information is retained as a vote.

6 Claims, 6 Drawing Sheets

(56) References Cited

U.S. PATENT DOCUMENTS

| | | | |
|---|---|---|---|
| 6,865,543 B2* | 3/2005 | Gibbs, Sr. | 705/12 |
| 6,873,966 B2* | 3/2005 | Babbitt et al. | 705/12 |
| 6,968,999 B2* | 11/2005 | Reardon | 235/386 |
| 7,036,730 B2* | 5/2006 | Chung | 235/386 |
| 7,099,471 B2* | 8/2006 | Neff | 380/30 |
| 7,117,368 B2* | 10/2006 | Sako | 713/180 |
| 7,389,250 B2* | 6/2008 | Neff | 705/12 |
| 7,640,181 B2* | 12/2009 | McClure et al. | 705/12 |
| 2001/0011351 A1* | 8/2001 | Sako | 713/180 |
| 2002/0019767 A1* | 2/2002 | Babbitt et al. | 705/12 |
| 2002/0066780 A1* | 6/2002 | Balolia | 235/51 |
| 2002/0077885 A1* | 6/2002 | Karro et al. | 705/12 |
| 2002/0077887 A1* | 6/2002 | London Shrader et al. | 705/12 |
| 2002/0083126 A1* | 6/2002 | Best et al. | 709/203 |
| 2002/0128978 A1* | 9/2002 | Neff | 705/64 |
| 2002/0169756 A1* | 11/2002 | Biddulph | 707/3 |
| 2003/0028423 A1* | 2/2003 | Neff | 705/12 |

OTHER PUBLICATIONS

Jinn-Ke Jan, Chih-Chang Tai, A secure electronic voting protocol with IC cards Proceedings. Institute of Electrical and Electronics Engineers 29th Annual 1995 International Carnahan Conference on Security Technology, Oct. 18-20, 1995, pp. 259-265.*

California Internet Voting Task Force Jan. 18, 2000, Retrieve Jan. 6, 2005 from http://www.ss.ca.gov/executive/ivote/.*

Herschberg, Mark, Secure Electronic Voting Over the World Wide Web Massachusetts Institutue of Technology, May 1997.*

SafeVote.com—Contra Costa Shadow Election Test Nov. 2000, Retrived from WebArchive.org Jan. 6, 2005.*

A, Menezes, P. van Oorschot, and S. Vanstone, Handbook of Applied Cryptography, CRC Press, 1996. Available on line: http://www.cacr.math.uwaterloo.ca/hac/.*

L. Cannor and R. Cytron, Sensus: A security-concious electronic polling system for the Internet Proceedings of the Hawaii International Conference of System Sciences, 1997.*

Cohen, Josh et al., A Robust and Verifiable Cryptographically Secure Election Scheme Yale, Jul. 1985.*

Iverson, Kenneth, A Cryptographic Scheme for Computerized General Elections Advanced in Cryptology, CRYPTO '91, 1991.*

Nurmi, Hannu et al., Secret Ballot Elections in Computer Networks Computers & Security, vol. 10, 1991, pp. 553-560.*

Jan, Kinn-Ke et al., A Secure Anonymous Voting by Employing Diffie-Hellman PKD Concept IEEE, 1995, ISSN: 0-7803-2627-X.*

Radwin, Michael, An untraceable, universally verifiable voting scheme Dec. 12, 1995.*

Cramer, R.J.F. et al., Multi-authority secret-ballot elections with linear work CWI, 1995, ISSN: 0169-118X.*

Cranor, Lorrie Faith et al., Design and Implementation of a Practical Security-Concious Electronic Polling System Washington University, Jan. 23, 1996.*

Cranor, Lorrie Faith, Electronic Voting Crossroads—AMC, Apr. 1996.*

Baker, Dixie et al., PCASSO: Applying and Extending State-of-the-Art Security in the Healthcare Domain IEEE, 1997, ISSN: 0-8186-8274-4, pp. 251-260.*

Mu, Yi et al., Anonymous Secuire E-Voting over a Network ASAC 1998.*

Schoenmakers, Berry, Fully Auditable Electronic Secret-Ballot Elections Xootic Magazine, Jul. 2000.*

Baker, Dixie et al., Assurance: the power behind PCASSO security AMIA, Nov. 1999.*

Adler, James et al., Computational Details of VoteHere Homomorphic Election System VoteHere, Inc., 2000.*

Gereck, Ed, Overview of Certification Systems: X.509, PKIX, CA, PGP & SKIP The Bell, Jul. 2000.*

VoteHere.Net Web Pages Aug. 2000, Retrieved from Archive.org Feb. 22, 2006.*

Schneier, Brue, Applied Cryptography Second Edition John Wiley & Sons, 1996, Table of Contents, ISBN: 0-471-12845-7.*

Borrell, Joan et al., An implementable secure voting scheme Computers & Security, vol. 15, No. 3, 1996, pp. 327-338.*

Decher, Alan, The Voter Certified Ballot Feb. 13, 2001, Retrieved from www.go2zero.com/votereform.html.*

Google.com—Primary Key definition Retrieved May 28, 2008.*

Wikipedia.org—Unique Key definition Retrieved May 28, 2008.*

Cranor et al., Design and Implementation of a Practical Security-Concious Electronic Polling System Washington University, WUCS-96-02, Jan. 23, 1996.*

Cranor et al., Design and Implementation of a Practical Security-Conscious Electronic Polling System Washington University, WUCS-96-02, Jan. 23, 1996.*

* cited by examiner

METHOD AND SYSTEM FOR SECURING NETWORK-BASED ELECTRONIC VOTING

FIELD OF THE INVENTION

The invention relates to a method and system which provides security techniques to secure a voting system for use on a wide area network such as the global computer network, or on a local area network.

BACKGROUND OF THE INVENTION

The current approaches to provide a secure voting system on a wide area or local area network have traditionally emphasized purely cryptographic-protocol-based solutions to secure the voting. The work done to date is largely purely research into specific issues in secure electronic voting and does not address the practical application into a real-world system.

The prior art has approached worldwide area network, for example, on the global computer network known as the Internet, elections as an extension of secure, electronic commerce techniques without providing a comprehensive approach to the significant threats, vulnerabilities and risks that threaten the security, authenticity and reliability of such elections.

Internet elections must achieve the objectives of conventional elections, specifically: "democracy" (only registered citizens may vote once in any election), accuracy (votes may not be altered, forged or deleted), "privacy" (no one may know how anyone else voted or prove how they voted), and "verifiability" (everyone should be able to verify their own ballot, as well as the correctness of the entire election). Moreover, Internet elections address additional capabilities: "mobility" (individuals should be able to vote from any Internet-accessible location, at any legal time), "convenience" (voting should be simple and convenient for everyone), and "flexibility" (the technology should be applicable to all elections).

Internet voting systems must achieve these objectives in the face of both conventional election threats, and threats specific to automated, distributed computer systems, including: fraud, abuse of privilege (privileged individuals may act inappropriately), denial of service (computer services may be impaired or rendered inaccessible), software flaws, tampering (of recorded ballots or other data), malicious software, wiretapping (sniffing, modification or replay of communications), vote selling, or masquerading (by client/server computers or by people).

The prior art has taken several approaches towards Internet election systems. Electronic commerce or E-Commerce approaches rely on securing communications through encrypted connections and verifying individual identity only through weak or single-factor authentication (e.g., passwords). Encrypted Absentee Balloting systems emulate conventional absentee balloting by using ballots that are doubly encrypted using symmetric keys. Cryptographic protocols, particularly those relying on asymmetric or public-key cryptography hold the greatest promise but have been relegated largely to the academic community.

All these techniques have characteristic weaknesses. E-Commerce techniques secure only voter-system communications. They provide weak authentication and no (strong) mechanisms for achieving democracy, privacy, accuracy or verifiability. Encrypted Absentee Ballot systems provide better privacy, but provide no stronger mechanisms for democracy, accuracy or verifiability, and are vulnerable to abuse of privilege, potentially compromising the keys used to ensure privacy. Many of the cryptographic protocols developed to date are complex, making implementation verification difficult. Public-key cryptography and digital signature techniques promise strong authentication, accuracy and verifiability. However, the generation and distribution of public-private (secret) key-pairs, and the protection of private keys, makes these techniques difficult to apply to large-scale applications such as Internet voting.

Specifically, it has been recognized that existing private-key management techniques, i.e., PKI approaches, are not acceptable if they require the end users to buy, install or configure anything, or require any particular type of client device. Such considerations become particularly significant when there may be huge numbers of end users, for example, 100,000 to 1,000,000, such as may be the case in an election.

It is recognized that PKI technology supports the use of public-key cryptography by providing various means to generate public-private (secret) key pairs, protect access to the private (secret) key so that it can be used only by the individual with whose identity it is associated, and provide for distribution and convenient access to the public key. Common strategy involves generation of public/secret key pairs on a user's personal computer by an application such as a web browser, storage of the private key within a personal identification number (PIN) protected, encrypted key-store file on the user's personal computer (PC), and exportation of the public key to a certificate authority, for example, where it is wrapped in a digital certificate, such as an X.509 digital certificate, and made available for public access on a lightweight directory access protocol (LDAP) certificate directory service.

This approach has advantages in that it is convenient and the private keys never leave the user's PC. Disadvantages result, however, because even though the private keys are protected in PIN-based encrypted files, PCs offer little protection against key-store cryptoanalysis by malicious software, and user mobility is impaired as it requires effort to export a private key so that it can be used on another platform.

An alternative strategy involves generation of public/secret key pairs on a secure platform rather than the user's PC, for example, a server. Yet still further, the approach involves storage of the private key, and perhaps other authentication-related data, on a storage device such as a password-encrypted floppy disk, or on a password-protected token/dongle, Java-ring (iButton) or smart card devices, as well as exportation of public keys and digital certificates as described with respect to the first approach.

One advantage of this approach is that the private key is more easily accessed from various computers, facilitating mobility, so long as there is a hardware interface for the private-key device. In addition, the private key is better protected within a removable device. Resultant disadvantages include the fact that the server must be verified not to make/leave copies of the private key. In addition, there must be some sort of hardware interface to allow retrieval of the key from the storage device, e.g., disk drive, USB port, iButton/smart card reader, etc. Yet still further, these hardware interfaces may be expensive, difficult to install/configure, and may not be universally available, thus inhibiting mobility.

The advantages and disadvantages of the above-identified two approaches have led to a third approach. In the third approach, generation of public/secret key pairs is done on a secure platform other than the user's PC, for example, a server. The secret keys are stored in encrypted form on the secure server and downloaded to the client over a secure network connection as needed to support authentication, digital signature or encryption operations. The server must authenticate the user by some non-PKI-based method before allowing the user to download their private key. In most cases, this will still require some authentication device.

While providing further refinements and including advantages such as convenience and mobility being improved because private keys are always available from a network server, and no hardware interfaces are required on the client device, significant disadvantages still remain.

Initially, it is noted that there is a need for a secondary strong authentication technique that requires hardware token support, e.g., SecureID. In addition, such hardware tokens incur additional expense, and private keys are stored on a secure server using one or more keys known to the server, thus requiring the server to protect access to and use of these keys.

In all three approaches described, retrieval of private keys from local/network storage is required for use within the memory of a PC or thin-client device, and exposes the key to potential compromise. Only tokens with processors can perform the necessary cryptographic operations without exposing the private key. None of the approaches offer sufficient security, mobility and convenience at a sufficiently low cost to make public/private key cryptographic services, e.g., authentication, non-repudiation, encryption, attractive for applications with a potentially large number of users such as in the case of an election with users numbering from anywhere between 100,000 to about 10,000,000.

In order to make public/private key cryptographic services feasible for such applications, there must be a low-cost way to generate public/secret keys, while providing secure storage for and access to those keys without requiring special hardware or inconvenient procedures. These advantages and other advantages are provided by the system and method described herein, and numerous disadvantages of existing techniques are avoided.

SUMMARY OF THE INVENTION

In accordance with one aspect of the invention, three is provided a method for assisting a user in verifying a cast ballot stored in a server. The method includes forming a digital signature of the cast ballot using a private key of the server, associating the cast ballot such digital signature with a vote serial number (VSN), then forming a confirmation token comprising the digital signature of the cast ballot using a private key of the server and VSN. The token is then made available to a user. When the user wishes to individually verify that his vote has been recorded correctly recorded, the user sends the token to the server where the VSN and signature of the cast ballot using a private key of the server are extracted from the token. For VSN equal to the extracted VSN, the received digital signature of the cast ballot using a private key of the server is compared to a stored digital signature of the cast ballot using a private key of the server. If the comparison shows equivalence between the data compared, determining that $B_{cast}$ is verified.

As described herein, the terms "individual", "user", "client", and "voter" are used interchangeably, and refer to a person on their own terminal which can be a personal computer or other like device on which voting in accordance with the method and system herein is achieved.

In a more specific aspect, the confirmation token further comprises a digital signature of an aggregation comprising the associated cast ballot and VSN using the server's private key. The additional token element is extracted from the token returned to the system and the cast ballot is verified only upon the additional condition that received element is equivalent to its stored sibling.

Yet still further, the method involves recording in the server's data store the server's digital signature of the ballot to allow verification at the server that all of the ballots cast have not been tampered with.

In a more specific application, while the ballots are initially described as being generated as an HTML document, to provide additional security, in an alternative form the ballot can be generated in bit-map form such that the intentions of the voter or individual voting may be determined by monitoring the (x, y) coordinates of their mouse-clicks on the ballot bit-map. This provides enhanced security, since to read bit-map documents requires advanced optical character recognition technology, which in turn requires and imposes a large computing power overhead, thus making malicious hacking into the system significantly more difficult and detectable.

Yet still further, the server is further configured for receiving the ballot choices and creating a data element from the electronic signature of the individual's ballot choices, the server's electronic signature of the individual's ballot choices, and the vote serial number to allow recording of the ballot choices in the data store and retained therein as a vote. This data element is then digitally signed using the server's private key to ensure its integrity and authenticity.

In a further aspect, the server is programmed for confirming retention of the vote at the data store by signing the individual's signature of the ballot choices, the server's signature of the ballot choices and the vote serial number, and thereafter transmitting the signed confirmation to the individual who submitted the ballot.

Yet still further, the system provides that the server is programmed for recording in the data store the server's digital signature of the ballot choices for allowing verification at the server that all of the ballots cast have not been tampered with.

In a still further aspect, the system is capable of generating the ballot as either a bit-map or an HTML document. The advantage of the bit-map document is that tampering or hacking becomes more difficult because bit-map documents require optical character recognition as previously discussed, such that malicious hacking is not easily achieved without detection.

BRIEF DESCRIPTION OF THE DRAWINGS

Having thus briefly described the invention, the same will become better understood from the following detailed discussion presented herein, with reference to the appended drawings, in which.

DETAILED DESCRIPTION OF THE PREFERRED EMBODIMENT

Figure 1:
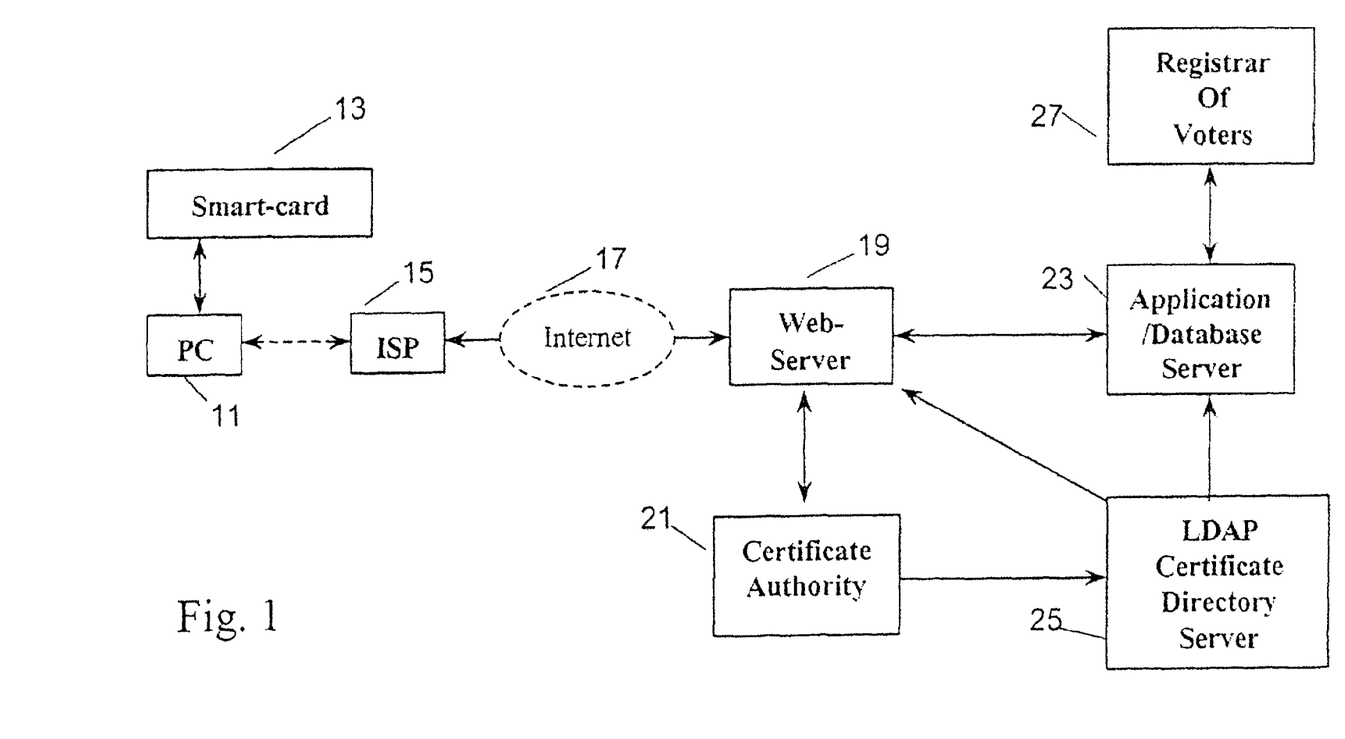
FIG. 1 is a system-level architectural view of how an operational system implementing electronic voting over a network, such as the global computer network known as the Internet, can be configured.

FIG. 1 is a system-level architectural view of how an operational system and method as described herein might be implemented. The client personal computer 11 or PC 11, typically a personal computer running an operating system such as Microsoft Windows™, which may optionally include a smart card reader 13 connected thereto, although this is not required. The PC 11 includes network access capability which can be to the local area network, or to a global computer network 17. In the case of a global computer network 17, the PC 11 would have access to the global computer network 17 through, for example, an Internet service provider (ISP) 15, or alternatively, access to other parts of the network might be through a direct cable modem, or a local, or a network attachment to the global computer network 17.

On the server side, there is provided a primary interface to the entire system through a web server 19 in a conventional manner which is well known to those of ordinary skill in the art, and which is common to most electronic commerce architectures. The web server 19 interoperates with a certificate authority 21, which can be for example, an enterprise server suite such as that available from Netscape Corporation. The certificate authority 21 uses a certificate-generating system, such as one like that available commercially under the name iPlanet, which is conventional, and which is one of many alternatives which can be used to implement the functionality described herein.

In addition, the web server 19 can also interoperate and be connected to a back end application or database server 23 and an LDAP certificate directory server 25.

With respect to the LDAP certificate directory server 25, by way of explanation, it can provide a certificate such as an X.509 certificate, which is a text file that is used to contain information about an individual, together with an encoding of the individual's public encryption key to the system described herein. The certificate file is then digitally signed by the certificate authority 21 that issued it. If it is desired to use the public keys of a number of individuals in an open context, there has to be a way of accessing the X.509 certificates. This can be done by placing them on a lightweight directory access protocol server (LDAP) such as the LDAP certificate directory server 25 shown, through which access to those certificates can be provided. For example, LDAP servers are provided commercially through a number of entities, and it is possible to obtain from such servers another party's public key certificate, for example, if it is desired to provide digitally signed, encrypted electronic mail.

More specifically, LDAP is a protocol on a data architecture for storing name-value pairs and on an LDAP certificate directory server 25 there would be stored certificates, such as X.509 certificates bound to each individuals' name.

With respect to the application database server 23, it is also conventional and well known to those of ordinary skill in the art. Such an application database server 23 can be implemented using Java Servlets or Enterprise Java Beans (EJBs), which are typically small packets of functionality to make it easy and more efficient to use the more sophisticated Java implementation of web server 19 functionality. In operation, the web server 19 receives a request for a certain web page and in that web page is a reference to some call onto a piece of Java functionality that is written as a Java Servlet. An architecture known generally as the application database server 23 architecture allows the web server 19 to call functionality in the database server using Java Servlets or EJBs 23. The application/database server 23 is typically a separate machine that is specifically optimized to support the invocation of that kind of functionality, encoded, for example, as Java Servlets. More particularly, the application database server 23 allows invoking of precompiled and packaged functionality that is written in the form of Java Servlets, Ems, or some other type of reusable component.

In the case of the present system and method, the reusable functionality will involve, for example, delivery of a ballot, which can be either in the form of an HTML or XML document, or for enhanced security as will be described hereafter, in the form of a bit-map.

Thus, when a user interacts with the web server 19 from their PC 11, a Servlet, or one or more EJBs, processes the request for the user to register with the system, including a request to cast a ballot. The Servlet or Ems that are invoked present the ballot to the user, and handle the interaction with the user in the course of casting the vote.

If it is desired to look at the results of an election, another Servlet or a different set of EJBs can be invoked to support that functionality. As may be appreciated by those of ordinary skill in the art, fine-grained packaging of functionality can be defined depending on the capabilities to be implemented as described hereafter.

In one implementation, a Registrar of Voters 27 may also be tied into the system and would be responsible for the registration of individuals who are legitimately, legally allowed to vote in a particular county. One way of conducting the registration is the conventional interacting in person with the Registrar of Voters, or through conventional mail. It is contemplated herein that such registration could be accomplished over the network, such as the global computer network 17, in a manner that it may be desired to have an electronic interface to the Registrar of Voters 27.

For example, one method of establishing the interface may be with a local Division of Motor Vehicles, particularly because of recent trends toward making the Division of Motor Vehicles responsible for identification and authentication of individual entities, and the Registrar of Voters appears to be an organization that might be able to use such capability.

As will also be appreciated, in the case of implementing an interface with the Registrar of Voters 27, some kind of X.509 certificate exchange as discussed previously could also be implemented, and the use of certificates would serve to authenticate any sort of interaction with the Registrar of Voters 27. In addition, if an individual submitted a registration or request, it could be digitally signed and thus would require the individual's public key certificate in order to validate the signature.

In all cases, it would be required to digitally sign some electronic document, and the digital signature would have associated with it a well-known identity which can be looked up on a server such as an LDAP certificate directory server 25 to obtain the public key certificate corresponding to the claimed identity, and to then verify that the digital signature is actually a signature that could only have been generated by the individual having the claimed identity.

This is all standard public key infrastructure technology and well known to those of ordinary skill in the art. In the case of the Registrar of Voters 27, this could be done through a certified agent for registering the voters, and there might be several methods by which such agents could be implemented and authorized by the Registrar of Voters 27. Irrespective of what system is implemented, the agent would be acting as a front end to the Registrar of Voters 27, and proxying the registration to them, and so, it would have to be legally authorized to do so.

While on the server side a number of different individual functional components are shown, it will be appreciated as an alternative that all the functions can be implemented on a single server, or depending on the size of the system, the functions can be allocated to separate servers which themselves may be replicated. This is an alternative architectural approach well known to those of ordinary skill in the art, and only for the sake of clarity has the system been shown in FIG. 1 as separate boxes, which could be co-located on a single machine or duplicated or replicated on multiple boxes depending on the load and degree of redundancy and tolerance desired.

Figure 2:
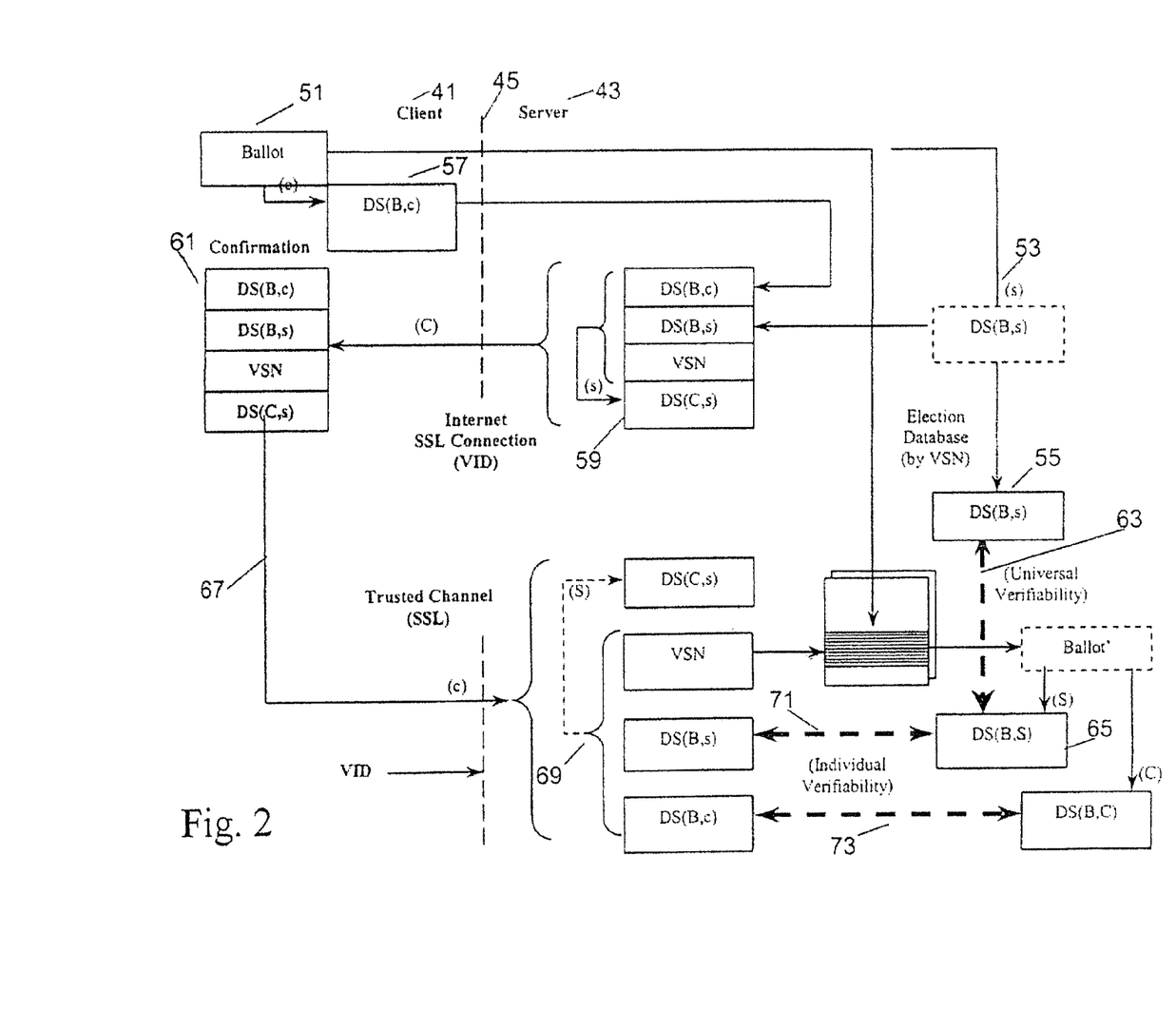
FIGS. 2 and 3 are diagrams illustrating the flow of the electronic ballot and associated data elements between an individual or client side, and a server side, managing the electronic voting method.
Figure 3A:
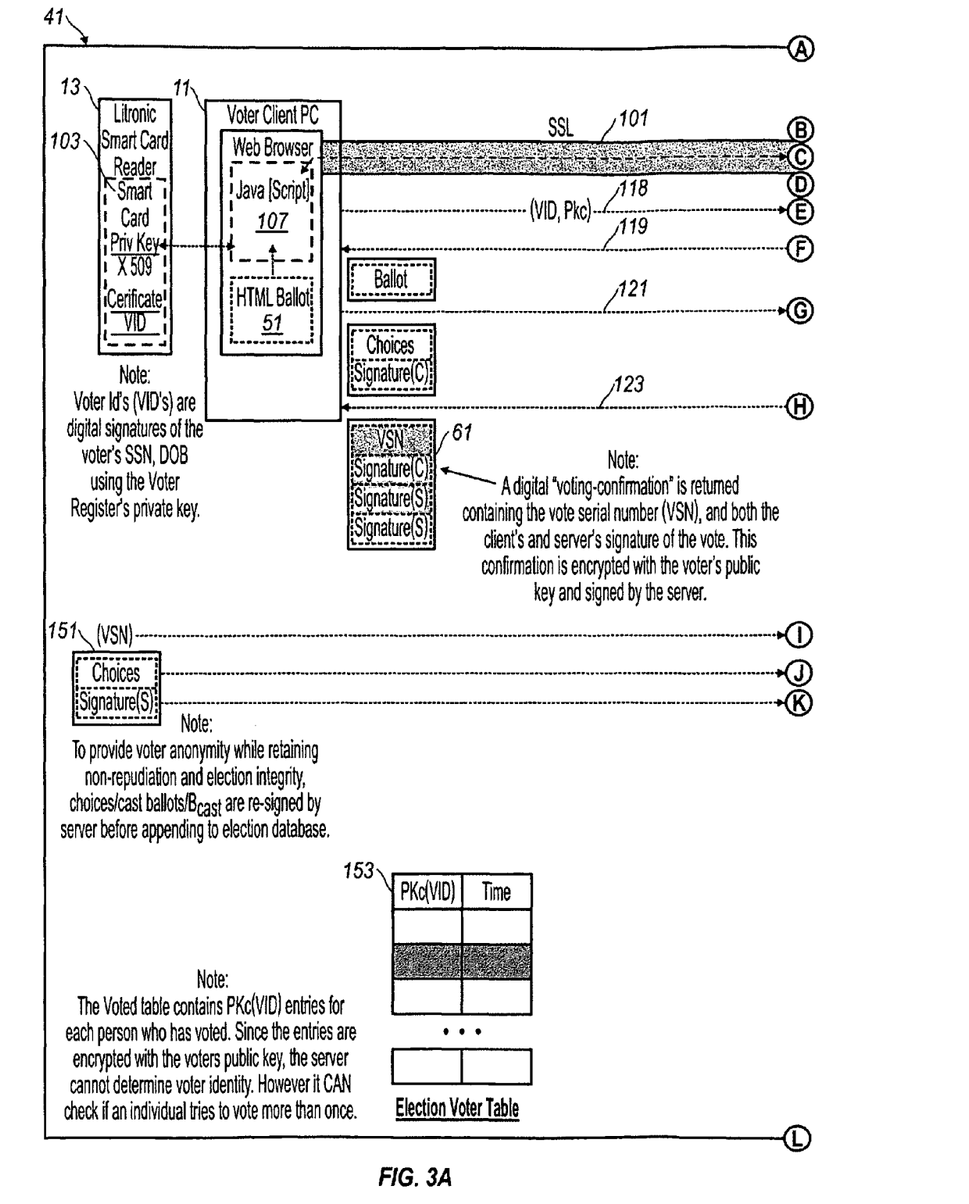
Figure 3B:
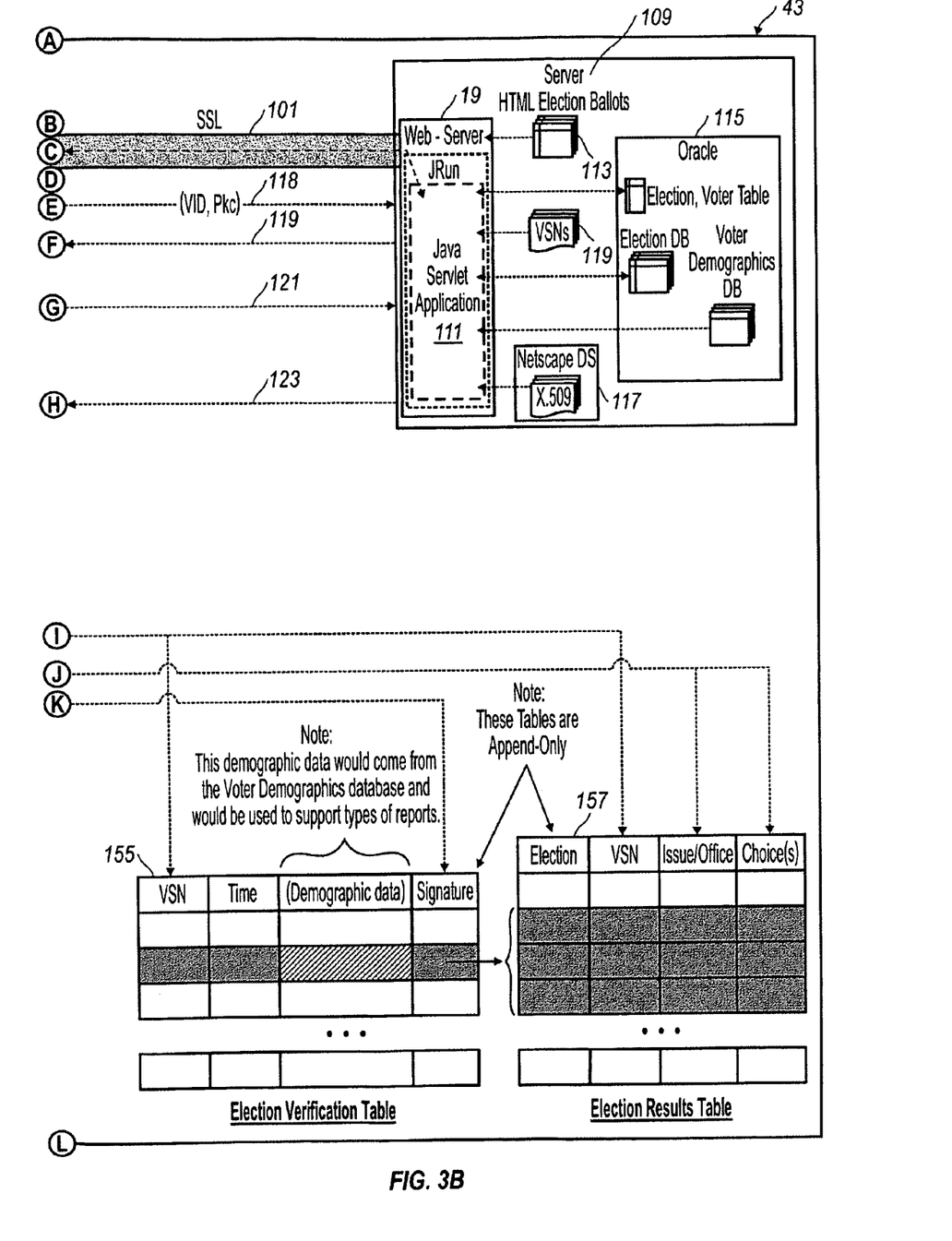

FIGS. 2 and 3 illustrate in block diagram form the data and information flow which will occur in a system and method as described herein. The components of data flow are shown divided by a dashed line which separates the client 41 side which relates to the individual and the individual's PC, and from the server 43 side.

A ballot on the client 41 side has been delivered from the server 43 side and can be some form of electronic document. The document can take various forms but for purposes of the description herein, the ballot is assumed to be an HTML form document, although more secure type and untamperable documents such as bit-map representations can also be deployed in accordance with the system and method.

One difficulty in building a system and method for such voting is being able to verify that only a single individual can cast a ballot, that they can cast only one ballot, and that it cannot be tampered with or undetectably altered or detected in any manner. FIGS. 2 and 3 illustrate the relationships between data elements in an implementation for being able to achieve these goals.

The ballot is delivered, for example, to the home PC 11 through the web server 19 from the application database server 23, all of which were previously described with respect to FIG. 1. Using the home PC 11, through a web browser, an individual can go through and make selections on the ballot, and after pressing enter or casting the ballot, the PC 11 transmits back a subset of that form consisting of the cast ballot $B_{cast}$ 51 and the voter's private digital signature of $B_{cast}$, i.e., $DS(B_{cast}, v)$.

Thus as is shown in FIG. 2, in the top arrow line from $B_{cast}$ 51, the choices are delivered as a representation to the server side 43. The cast ballot $B_{cast}$ 51 is structured in a way that it is easy to read the response values and determine which issues or offices were being voted on, and what the selections were. Those values are parsed and stored into a relational database 55, the structure of which will be described hereafter with reference to a separate figure. When the ballot is received on the server side 43 the server computes $DS(B_{cast}, s)$ 53, a digital signature of the cast ballot using the server's 43 private key.

Throughout this disclosure in labels such as DS( . . . , C) or DS( . . . , c), an upper case letter in the second position means a public key, and a lower case letter means a secret or private key, so that in any particular block, this refers to the fact that when a ballot is received for example, the server creates a digital signature of the ballot using the server's secret or private key. On the client 41 side, when an individual casts a ballot, the client 41 side creates a digital signature of the ballot 57 using the individual's secret or private key. Thus, both of these signatures, one created by the individual, and the other created by the server, can only have been created by the respective entities because they are both signatures that are created using the respective secret or private keys.

The individual's signature of the cast ballot $DS(B_{cast}, v)$ 57 is delivered to the server 43 side where it is combined with three other elements to form a confirmation token T 61. Specifically, the server's signature of the cast ballot $DS(B_{cast}, s)$ 53 is first combined with the individual's signature of the cast ballot $DS(B_{cast}, v)$ 57 along with a vote serial number (VSN) 58. Together the three can be seen as a confirmation sub-token ("CS"). Note that the VSN can be like a ballot serial number and can be an arbitrary number that goes from one to infinity; it can be generated per election, and has no relationship to the voter, and is just an incidental sequence number that indicates a vote delivered in the election. The sub-token is then digitally signed by the server using the server's private key yielding $DS(CS, s)$ 59, and the four (i.e., three elements of the sub-token and the server's private signature of the subtoken) combine into an aggregation of core components which is the ballot confirmation token T 61. This allows confirmation that a particular ballot has been retained in the system and no tampering has occurred. That token is then transmitted back to the individual as confirmation token 61. The confirmation token 61 can then be encrypted with the individual's public key, thus rendering it undecipherable to anyone except the individual.

Such encryption is not mandatory but may be desirable, depending on other specific implementations of the system and method. For purposes of the disclosure herein, it is noted that while the term "token" is referred to, it could be characterized as a data element which is the signature confirmation by the server, in particular, the confirmation which has three components and a digital signature. Thus, by tying these components together, and having the server sign the components, if later on someone submits the confirmation, the server can verify that the confirmation was issued by the server, minimizing the possibility that confirmations can be forged.

On the server 43 side, the server's digital signature of the cast ballot $DS(B_{cast}, s)$ is also recorded along with the cast ballot in a database shown at block 55. If it becomes desirable to verify that all of the ballots cast in the election have been untampered with, that can be done on the server 43 side using only the contents of the database and the server ballot signatures which have been recorded in the data store.

This is further illustrated by 63 which illustrates universal verifiability. More specifically, a search is conducted through the database in a manner indexed to a vote serial number, and for each vote serial number, a ballot is reconstructed. The reconstructed ballot has no identification back to the voter and is completely anonymous. However, the ballot responses are the same as those that the individuals generated when the ballot was cast. A digital signature can then be created over the reconstructed ballot using the server's public key, and that signature can be verified against the signature that was recorded when the individual cast the ballot that was created using the server's private key. Thus, the 63 represents the validation of the server's ballot signature created with its private key, against the server's ballot signature that was generated from the reconstructed ballot using the server's public key. This can be done for all of the ballots stored in the system, and thus, it can be verified that none of the ballots have been tampered with at any point in time after a ballot has been cast. This is referred to as universal verifiability, which refers to the property that allows for verification that for all voters none of the ballots have been forged, deleted or altered.

Consider now the case where an individual would want to connect to the system, i.e., on the server 43 side to determine if their cast ballot is properly recorded. In such a case, the individual can present vote confirmation, e.g., token 61, through a transmission 67 to the server 43 side. Of course, the individual will have to decrypt the confirmation Token 61 as previously discussed using their private key. The token 61 is then presented to the system which decomposes the token 61 into four components, which are represented by blocks 69 plus $DS_{token}(CS, s)$, and have been previously discussed with reference to blocks 59 and 61.

The digital signature on that confirmation can then be recomputed, and it can be verified that the confirmation has not been altered. Having done so, the vote serial number can then be extracted from the confirmation, and the database can be indexed to allow reconstruction of the voter's ballot exactly as cast.

Descriptors 71 and 73 illustrate what is known as individual verifiability. The server's ballot signature can be extracted out of the confirmation and validated against the server's ballot signature that is generated from the reconstructed ballot. This is demonstrated by the exchange which occurs through descriptor 71. The individual's ballot signature that was computed using the individual's private key can also be validated by the comparison represented by descriptor 73 against the digital signature that has taken over the reconstructed ballot using the voter's public key. This can be done because the communication between the individual and the server is protected, as illustrated later in FIG. 3, by a secure socket layer (SSL) connection 101 that provides temporary access to the individual's public key.

In fact, in such an implementation, the public key of the individual on the individual's end of the connection can be obtained outside of the system and once it is known what the individual's public key is, the requirement for an LDAP certificate directory server 25 to obtain the public key can be eliminated.

As may be appreciated from the discussion of individual verifiability, in contrast to universal verifiability, individual verifiability provides two ways of verifying by using either the server's digital signature or the individual's digital signature on the ballot.

FIG. 3 shows in greater detail the general architecture shown in FIG. 1, and the data flow shown in FIG. 2. Specifically, the upper part of FIG. 3 shows the various components of the system along with boxes showing the data flow, with the lower portion of FIG. 3 showing in greater detail the various resultant tables assembled with ballots that have been cast.

A smart card reader 13 can be implemented connected to an individual's PC 11 on a smart card 103 which is read by the smart card reader 13, and can have stored thereon an individual's private (or secret) encryption key. A certificate such as an X.509 certificate for their public key, and their voter identification number which is an arbitrary sequence number generated when they register with the system, can also be stored on the smart card 103. The individual's PC 11 will typically be running a standard web browser 105, such as is commercially available from Netscape Corporation, and inside the web browser 105 is a Java interpreter 107 with the ballot 51 presented within the web browser 105. Although the ballot has been previously described, and is illustrated in FIG. 3, as an HTML or XML document, it can also take other forms such as a bit-map, if enhanced security is desired.

While a personal computer 11 has been shown with a standard commercially-available browser 105, it may also be appreciated that such browsers are often not sufficiently secure. Thus, as contemplated herein, it is also possible to implement in a manner well known to those of ordinary skill in the art, a browser which avoids the security pitfalls of currently-existing commercial browsers.

More specifically, it is common for malicious software to read/modify sensitive files on unsecure personal computers. Such unsecure personal computer platforms can include those which are Intel processor/Microsoft Windows operating system, or Apple Macintosh operating system-based. Specifically, in such commercial systems, the security ends at the client. As a result, the entire system may be vulnerable to attack by malicious software executing within the individual's PC. With no individual platform security mechanisms, such attacks could detrimentally impact information confidentiality, integrity, authenticity, or availability within the overall system.

In order to address such a problem which may be inherent in a conventional commercial web browser, and with ballots such as an HTML or XML document ballot, a protocol can be implemented that combines anonymous context, and visual obfuscation to make it virtually impossible for malicious software to knowledgably and undetectably interfere with a concurrently executing individual PC application in order to impact information confidentiality, integrity and authenticity.

In accordance with the specific implementation of such security as contemplated herein, and as will be readily apparent to those of ordinary skill in the art, cryptographic techniques, protocols and data representation can be implemented in order to increase the work required of malicious software beyond what can be accomplished within a voting session at an individual's personal computer 11. Specifically, implementation of visual obfuscation is intended to defeat the ability of malicious software to determine or alter network content. Such a technique would include but not be limited to variation of text, font, size, spacing, etc. The wording of the text associated with ballot choices, the location of graphic components, the shape of image of choice/selection targets, explicit or implicit relationships between graphical elements, and in some cases, color, can also be implemented in an obfuscating manner. In addition, a technique for converting content in HTML or XML format to image format can be employed, making it difficult, with current OCR algorithms to intercept and alter the limited ballot information being transmitted. Such OCR techniques are generally processor intensive, and thus attempts by malicious software to alter or interpret such ballot information would be readily detected.

As shown in the FIG. 3 a voter ID and the public key of the individual is transferred at 118 over an SSL connection 101 to the web server 19 on the server 43. The server side 43 includes a number of function boxes assembled as one box 109. The web server 19 which includes an execution environment for Java Servlets 111 then sends a ballot 119 obtained from a collection of ballots 113, to the individual PC 11 through a transmission 119. The individual then marks the ballot and returns the ballot choices as shown with arrow 121. The confirmation shown as block 61 is then returned as shown by arrow 123.

It will be appreciated that within the collection 109 of function boxes, separate functionality and information is provided, for example, from the collection of election ballots 113, vote serial numbers 119, and certificates 117, characterized preferably as X.509 certificates. In the Figure, block 115 is typically the application database server 23 shown in FIG. 1 and serves to compile the election voter table, election database and optionally, a voter demographics database, all of which will be described hereafter with reference to the lower half of FIG. 3.

The lower half of FIG. 3 illustrates how the various pieces of information/data can be assembled. At block 151 it is seen that to provide voter anonymity, while retaining nonrepudiation and election integrity, cast ballots are re-signed by the server before appending to the election database. In this case, at box 151, there are reflected the choices the individual ballot items that the individual voter casts a vote for, and are stored in an election results table 157.

Table 157 conceptually includes four columns. The first column is the election in which the votes are cast. A separate database can be created per election but could also be done in this manner. The table 157 is indexed by the vote serial number (VSN), the issue or office being voted on, and the choice the individual makes. Thus, this is the table in which the ballot choices are stored. The vote serial number is also stored in a table 155 which is an election verification table. The purpose of this table is to retain the digital signatures that protect the integrity of the ballot and the election verification table has at least three columns and perhaps others. The election verification table is indexed by the vote serial number. It includes a column for time and a column for the digital signature. Optionally, demographic data could also be input into the election verification table 155 as long as this information would not, through inference or aggregation, divulge the voter's identity.

On the left side is shown the election voter table 153 which is a hashed table that in order to achieve single-vote verification, to ensure that individuals cannot vote multiple times, provides that the voter identification or ID is encrypted or hashed using a one-way transform. One option is to employ an encryption using the individual voter's public key, but any one-way transform would work. The contents of the table 153, since they are generated by a one-way hashed function are not reversible, so it is impossible to look into the table to see who voted. However, if an individual tries to vote more than once, the hash entry will collide with any new attempt to cast a second vote, and thus, there is provided a way of detecting a subsequent voting attempt without divulging anything about the identity of the individual.

Figure 4:
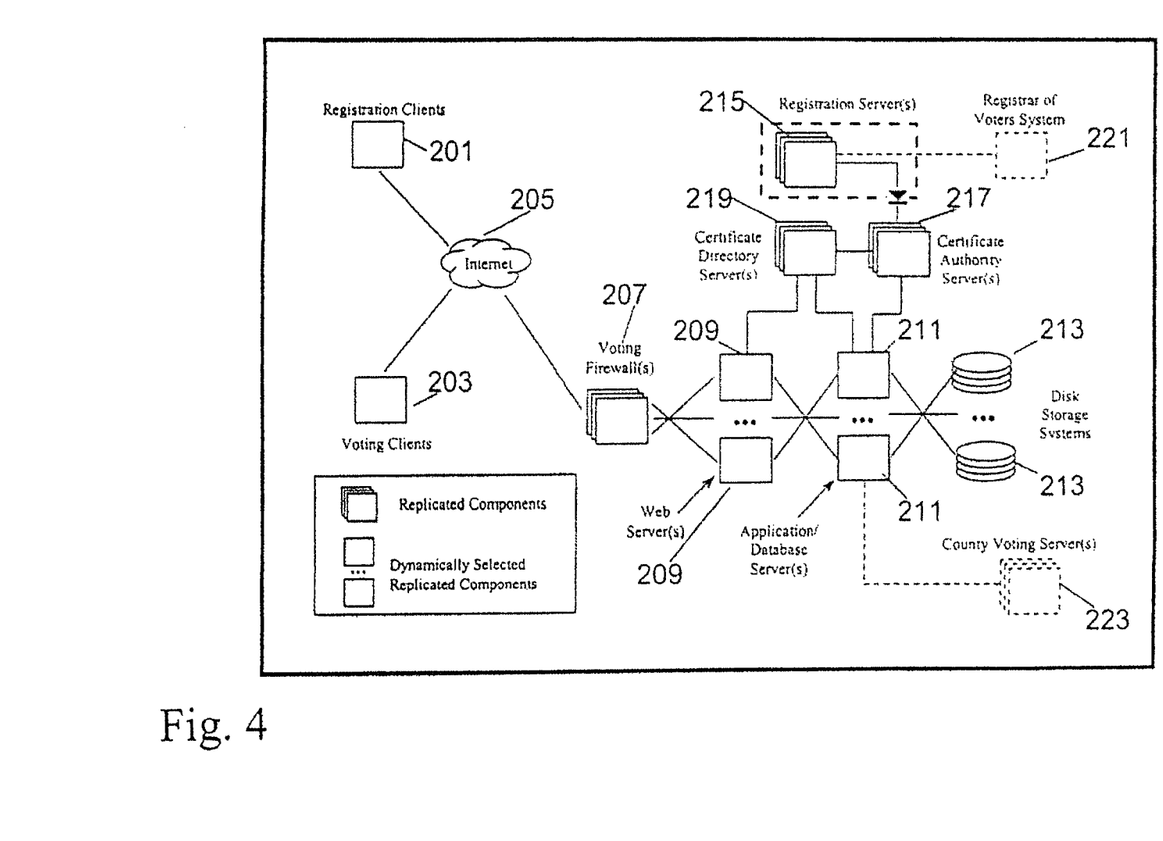
FIG. 4 is a block diagram showing in greater detail the components, and data information exchange illustrated in FIGS. 1, 2, and 3.
Figure 5:
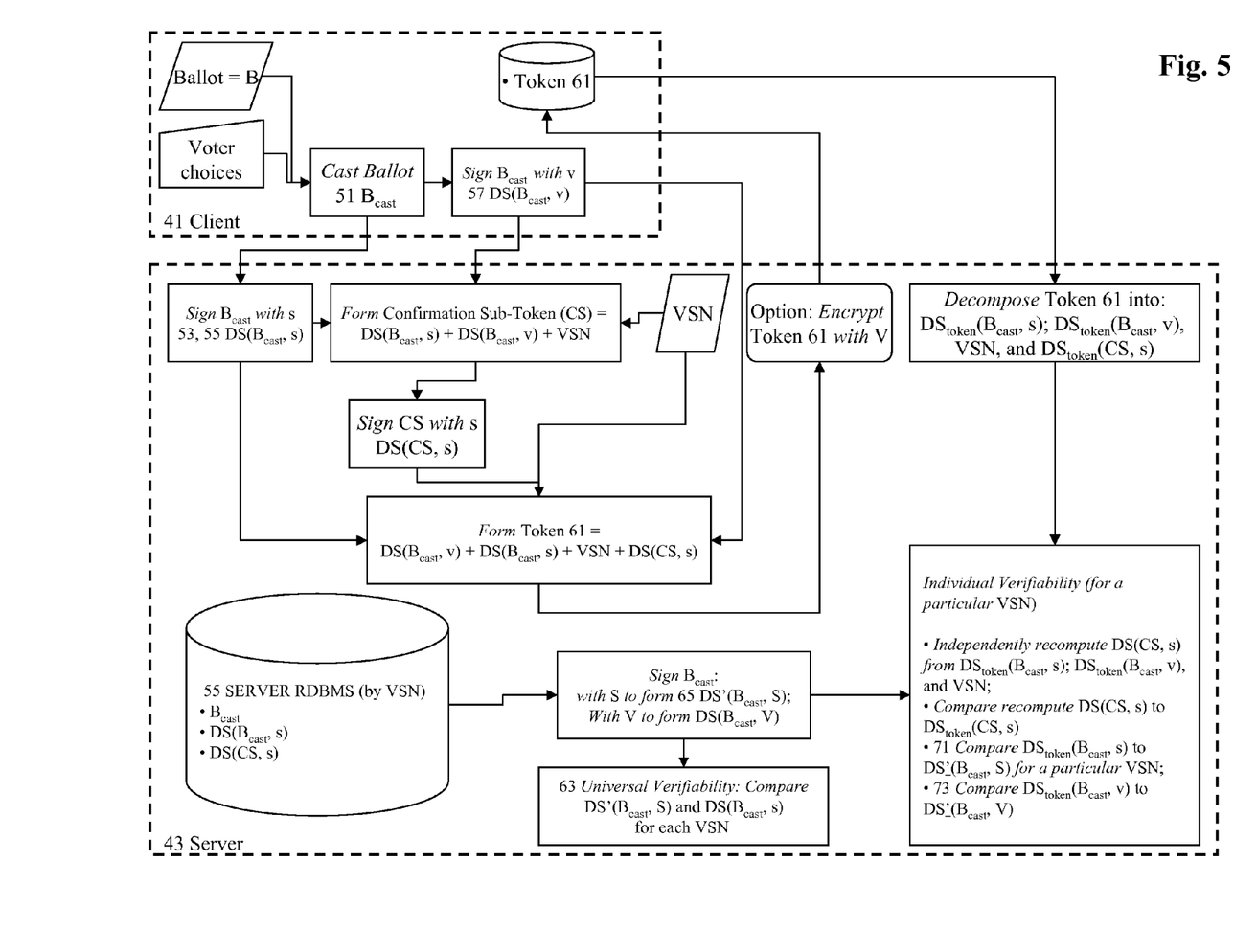
FIG. 5 is an architectural diagram showing in greater detail how a system and method as described herein could be deployed on a broad basis on a network such as the global computer network known as the Internet.

Turning now to FIG. 4, there is illustrated in block diagram form a large-scale production voting system architecture. Registration clients 201 at their personal computers are shown as able to register through connection through the global computer network 205, through a voting firewall 207, web servers 209 and application database servers 211, which may be ultimately connected to a Registrar of Voters system 221. The Registrar of Voters system 221 may provide registration information to a registration server 215 which cooperates as previously described with certificate directory servers 219, and certificate authority servers 217, and in cooperation with the other elements to allow delivery of a ballot to voting clients 203 to accomplish voting as previously described herein.

Having thus generally described the invention, the same will become better understood from the following claims in which it is set forth in a non-limiting manner.

The invention claimed is:

1. A method for assisting a user in verifying a cast ballot $B_{cast}$ stored in a server, the method comprising:
forming a digital signature of $B_{cast}$ using a server side private key $DS(B_{cast}, s)$ by a first server side computer software application process tangibly embodied in a physical program storage device executable by a server side physical computer hardware machine and executing on the server side physical computer hardware machine;
associating the $B_{cast}$ and $DS(B_{cast}, s)$ with a vote serial number VSN by a second server side computer software application process tangibly embodied in a physical program storage device executable by the server side physical computer hardware machine and executing on the server side physical computer hardware machine;
forming a confirmation token, comprising $DS(B_{cast}, s)$ and VSN by a third server side computer software application process tangibly embodied in a physical program storage device executable by the server side physical computer hardware machine and executing on the server side physical computer hardware machine;
making the confirmation token available by a fourth server side computer software application process tangibly embodied in a physical program storage device executable by the server side physical computer hardware machine and executing on the server side physical computer hardware machine to a first client side computer software application process tangibly embodied in a physical program storage device executable by a client side physical computer hardware machine and executing on the client side physical computer hardware machine of a user via a network;
receiving the confirmation token made available to the user by a fifth server side computer software application process tangibly embodied in a physical program storage device executable by the server side physical computer hardware machine and executing on the server side physical computer hardware machine from a second client side computer software application process tangibly embodied in a physical program storage device executable by the client side physical computer hardware machine and executing on the client side physical computer hardware machine via the network;
extracting $VSN_{received\ token}$ and $DS_{received\ token}(B_{cast}, s)$ from the received token by a sixth server side computer software application process tangibly embodied in a physical program storage device executable by the server side physical computer hardware machine and executing on the server side physical computer hardware machine;
for VSN equal to $VSN_{received\ token}$, comparing $DS_{received\ token}(B_{cast}, s)$ and at least one of $DS(B_{cast}, s)$ and $DS(B_{cast}, S)$ by a seventh server side computer software application process tangibly embodied in a physical program storage device executable by the server side physical computer hardware machine and executing on the server side physical computer hardware machine; and
determining that $B_{cast}$ is verified by an eighth server side computer software application process tangibly embodied in a physical program storage device executable by the server side physical computer hardware machine and executing on the server side physical computer hardware machine if the comparison shows equivalence between the data compared.

2. The method of claim 1 wherein:
the confirmation token further comprises a digital signature of an aggregation comprising the associated $B_{cast}$ and VSN using the server side private key DS(Aggregation, s);
extracting $DS_{received\ token}$ (Aggregation, s) from the received token; and
$B_{cast}$ is verified only upon the additional condition that $DS_{received\ token}$ (Aggregation, s) is equivalent to DS(Aggregation, s).

3. A method for assisting a user in verifying a cast ballot recorded in a server, the method comprising:
receiving by a first server side computer software application process tangibly embodied in a physical program storage device executable by a server side physical computer hardware machine and executing on the server side physical computer hardware machine at least one set of:
a cast ballot $B_{cast}$ and
a digital signature of $B_{cast}$ formed with the private key of a voter casting the ballot $DS(B_{cast}, v)$;
forming by a second server side computer software application process tangibly embodied in a physical program storage device executable by the server side physical computer hardware machine and executing on the server side physical computer hardware machine:
a digital signature of $B_{cast}$ using a server side private key $DS(B_{cast}, s)$,
associating $B_{cast}$, $DS(B_{cast}, v)$, and $DS(B_{cast}, s)$ with a vote serial number VSN;
forming by a third server side computer software application process tangibly embodied in a physical program storage device executable by the server side physical computer hardware machine and executing on the server side physical computer hardware machine a confirmation token, comprising:
$DS(B_{cast}, s)$, $DS(B_{cast}, v)$, VSN, and DS(Aggregation, s),
where DS(Aggregation, s) is the digital signature of the aggregation of the associated $B_{cast}$, $DS(B_{cast}, v)$, $DS(B_{cast}, s)$, and VSN;
making the confirmation token available by a fourth server side computer software application process tangibly embodied in a physical program storage device executable by the server side physical computer hardware machine and executing on the server side physical computer hardware machine to a first client side computer software application process tangibly embodied in a physical program storage device executable by a client side physical computer hardware machine and executing on the client side physical computer hardware machine of a user via a network;
receiving the confirmation token by a fifth server side computer software application process tangibly embodied in a physical program storage device executable by the server side physical computer hardware machine and executing on the server side physical computer hardware machine from a second client side computer software application process tangibly embodied in a physical program storage device executable by the client side physical computer hardware machine and executing on the client side physical computer hardware machine via the network;
extracting $VSN_{received\ token}$ and at least one of $DS_{received\ token}(B_{cast}, s)$, $DS_{received\ token}(B_{cast}, v)$, and $DS_{received\ token}(AG, s)$ from the received token by a sixth server side computer software application process tangibly embodied in a physical program storage device executable by the server side physical computer hardware machine and executing on the server side physical computer hardware machine; and
for $VSN_{received\ token}$ and the corresponding VSN, comparing by a seventh server side computer software application process tangibly embodied in a physical program storage device executable by the server side physical computer hardware machine and executing on the server side physical computer hardware machine at least one of:
$DS_{received\ token}(B_{cast}, s)$ and $DS(B_{cast}, S)$;
$DS_{received\ token}(B_{cast}, v)$, and $DS(B_{cast}, v)$;
$DS_{received\ token}$(Aggregation, s), and DS(Aggregation, s);
determining that $B_{cast}$ is verified by an eighth server side computer software application process tangibly embodied in a physical program storage device executable by the server side physical computer hardware machine and executing on the server side physical computer hardware machine if comparison shows equivalence between the data compared.

4. The method of claim 3 further comprising:
if comparison shows equivalence between $DS_{received\ token}$(Aggregation, s), and DS(Aggregation, s), determining that the received confirmation token has not been modified since its formation.

5. A method for assisting a user verifying a cast ballot recorded in a server, the method comprising:
receiving a cast ballot ("Bcast") by a first server side computer software application process tangibly embodied in a physical program storage device executable by a server side physical computer hardware machine and executing on the server side physical computer hardware machine;
forming a digital signature of Bcast using a server side private key ("DS(Bcast, s)") by a second server side computer software application process tangibly embodied in a physical program storage device executable by the server side physical computer hardware machine and executing on the server side physical computer hardware machine;
associating Bcast and DS(Bcast, s) with a vote serial number ("VSN") by a third server side computer software application process tangibly embodied in a physical program storage device executable by the server side physical computer hardware machine and executing on the server side physical computer hardware machine; and
for VSN, comparing DS(Bcast, s) and DS(Bcast, S) by a fourth server side computer software application process tangibly embodied in a physical program storage device executable by the server side physical computer hardware machine and executing on the server side physical computer hardware machine;
determining that Bcast is verified by a fifth server side computer software application process tangibly embodied in a physical program storage device executable by the server side physical computer hardware machine and executing on the server side physical computer hardware machine if the comparison shows equivalence between the data compared.

6. A method for assisting a user in determining that their cast ballot $B_{cast}$ has been properly recorded in a server, the method comprising:
receiving by the server from a user's computer the cast ballot $B_{cast}$ combined with a user's individual private key $DS(B_{cast}, c)$;
forming by the server a digital signature of $B_{cast}$ using a server private key $DS(B_{cast}, s)$;
recording by the server $DS(B_{cast}, s)$ in a server database;
associating by the server $DS(B_{cast}, c)$ and $DS(B_{cast}, s)$ with a vote serial number VSN;
forming by the server a confirmation token including $DS(B_{cast}, c)$ and $DS(B_{cast}, s)$, VSN and signed using server private key DS(C, s);
receiving the confirmation token at the user's computer from the server via a network;
encrypting the confirmation token at the user's computer with a user's individual public key;
receiving the encrypted confirmation token at the server from the user's computer;
decrypting the confirmation token at the server using a server public key;
decomposing the confirmation token at the server into $DS(B_{cast}, c)$ and $DS(B_{cast}, s)$, and VSN;
extracting VSN from the decomposed confirmation token;
reconstructing cast ballot $B_{cast\_reconstructed}$ at the server from the server database using the extracted VSN against an index for the server database;

determining at the server if $DS(B_{cast}, s)_{reconstructed}$ matches $DS(B_{cast}, s)$ and if $(B_{cast}, c)_{reconstructed}$ matches $DS(B_{cast}, c)$; and if both matches are confirmed at the server transmitting to the user's computer a confirmation of proper recordation of cast ballot $B_{cast}$.

\* \* \* \* \*